PULSE COMMUNICATION SYSTEM

Filed July 25, 1946 5 Sheets-Sheet 1

*INVENTORS*
JAMES A. KRUMHANSL
*BY* GLENN H. MILLER
T. L. Bowes
ATTORNEY

INVENTORS
JAMES A. KRUMHANSL
GLENN H. MILLER
BY T. L. Bowes
ATTORNEY

Oct. 25, 1955 J. A. KRUMHANSL ET AL 2,721,899

PULSE COMMUNICATION SYSTEM

Filed July 25, 1946 5 Sheets-Sheet 3

INVENTORS
JAMES A. KRUMHANSL
BY GLENN H. MILLER
T. L. Bowes
ATTORNEY

INVENTORS
JAMES A. KRUMHANSL
BY GLENN H. MILLER
J. L. Bowes
ATTORNEY

*INVENTORS*
JAMES A. KRUMHANSL
*BY* GLENN H. MILLER
T. L. Bowes
ATTORNEY

United States Patent Office 2,721,899

Patented Oct. 25, 1955

2,721,899

PULSE COMMUNICATION SYSTEM

James A. Krumhansl and Glenn H. Miller, Rochester, N. Y., assignors, by mesne assignments, to General Dynamics Corporation, a corporation of Delaware Application July 25, 1946, Serial No. 686,140

3 Claims. (Cl. 179—15)

This invention relates to systems of radio communication and more particularly to such systems in which intelligence is communicated by means of discrete pulses of radio frequency energy.

It has been proposed heretofore to transmit intelligence in the form of a train of pulses spaced apart or coded according to a function of time, as well as a function of the amplitude of a modulating voltage representing intelligence to be transmitted.

It is one of the objects of the present invention to provide new and improved apparatus for use in communication systems of the foregoing type.

It is another object of this invention to provide new and improved means for time modulating a train of pulses in communication systems.

In accordance with this phase of the invention, in a preferred embodiment thereof, there is provided a source of recurring voltage which normally varies periodically with respect to time, such as a blocking oscillator, for example. The voltage source is caused to produce output pulses at times varying with the amplitude of a voltage wave representing the intelligence to be transmitted, i. e., pulse time modulation. In the receiver, demodulating means is provided to reproduce the original intelligence. Reference pulses may be transmitted for control and timing purposes in which case the receiving means employs means for separating the reference and intelligence conveying pulses into series of pulses representing the respective sources. The demodulating means is utilized to produce a recurring voltage varying in amplitude according to the time intervals between signal pulses and adjacent reference pulses, whether preceding or following the signal pulses. Envelope detecting means responsive to such voltage is employed substantially to reproduce the voltage representing the original intelligence by a sampling process.

Conventional radio communication systems are based on the selection of one of a plurality of different signal channels on a frequency selection basis. It has been proposed to transmit a plurality of signals on one band of frequencies and utilize signal selection means at the receiver.

It is another object of this invention to provide a new and improved system of this type and especially to provide means for modulating and demodulating the signals utilized in such a system.

In accordance with the last mentioned phase of this invention, several audio signals are utilized to provide relatively short duration pulses which are transmitted without mutual interference by interspersing the pulses representing the different signals. Reference pulses may be used to synchronize transmitter and receiver.

Figure 1:
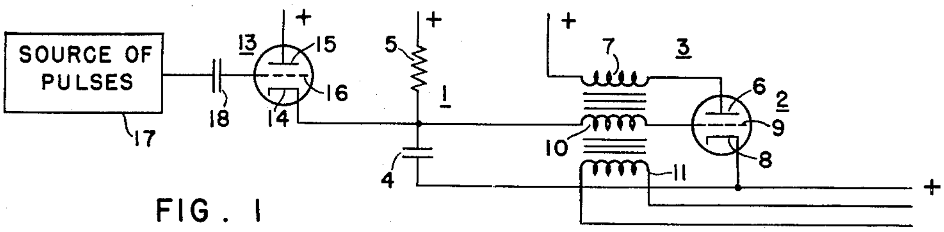
Figure 2:
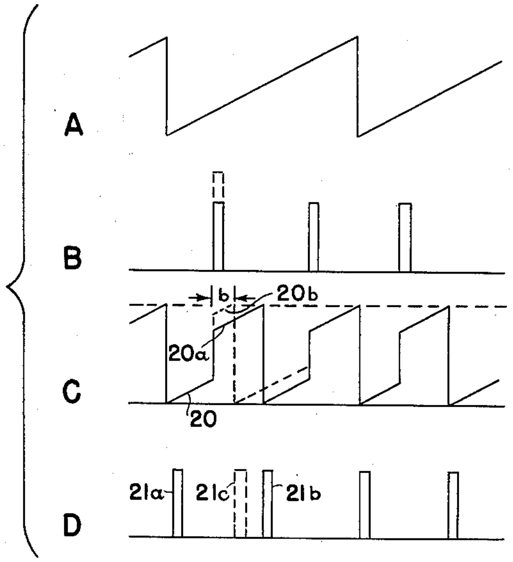
Figure 3:
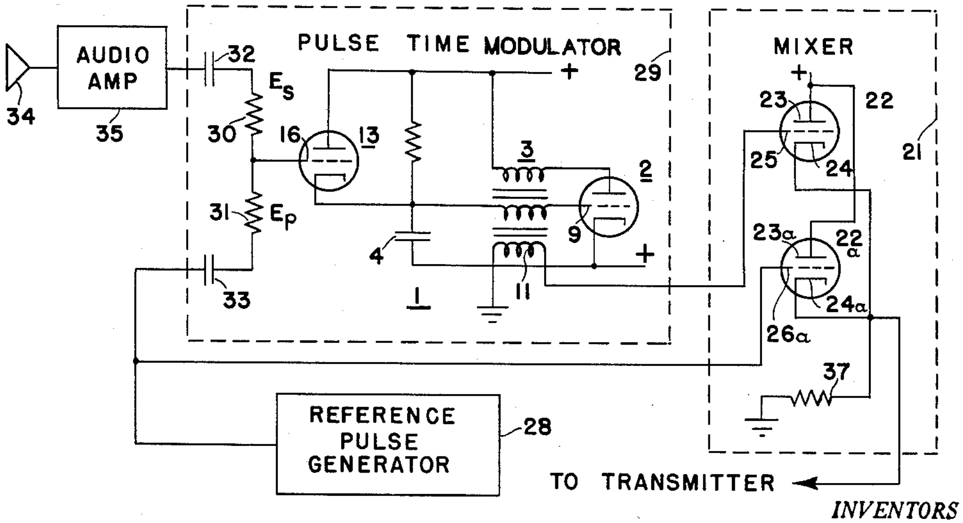
Figure 4:
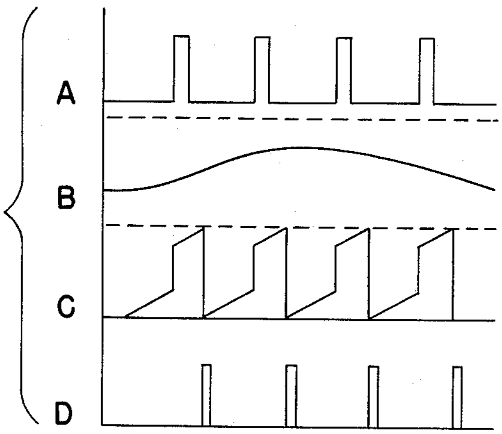
Figure 5:
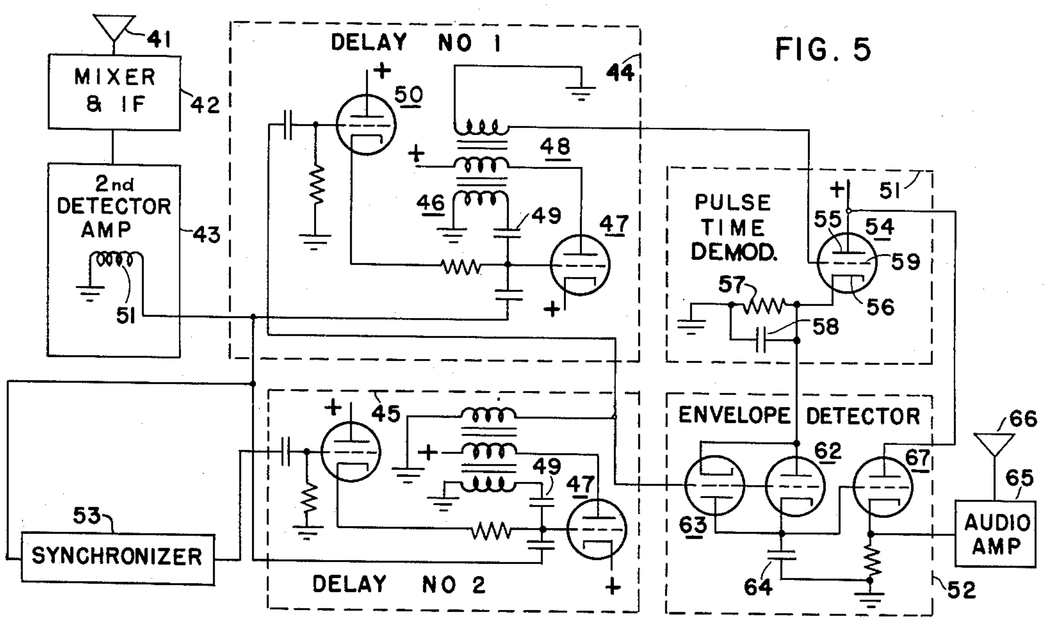
Figure 6:
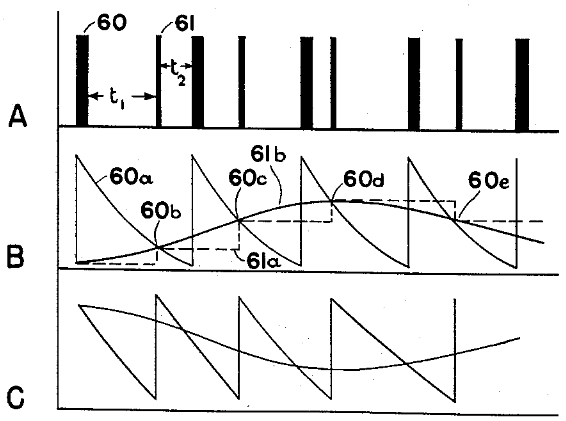
Figure 7:
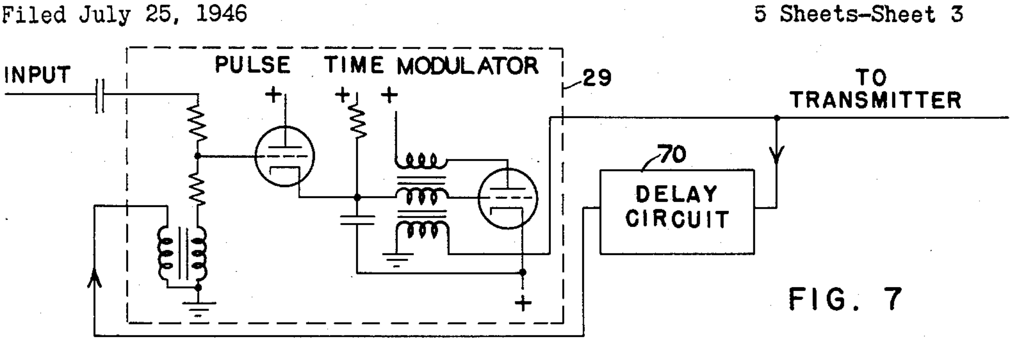
Figure 8:
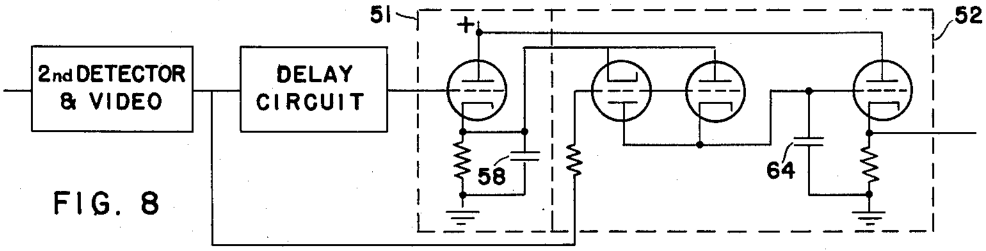
Figure 9:
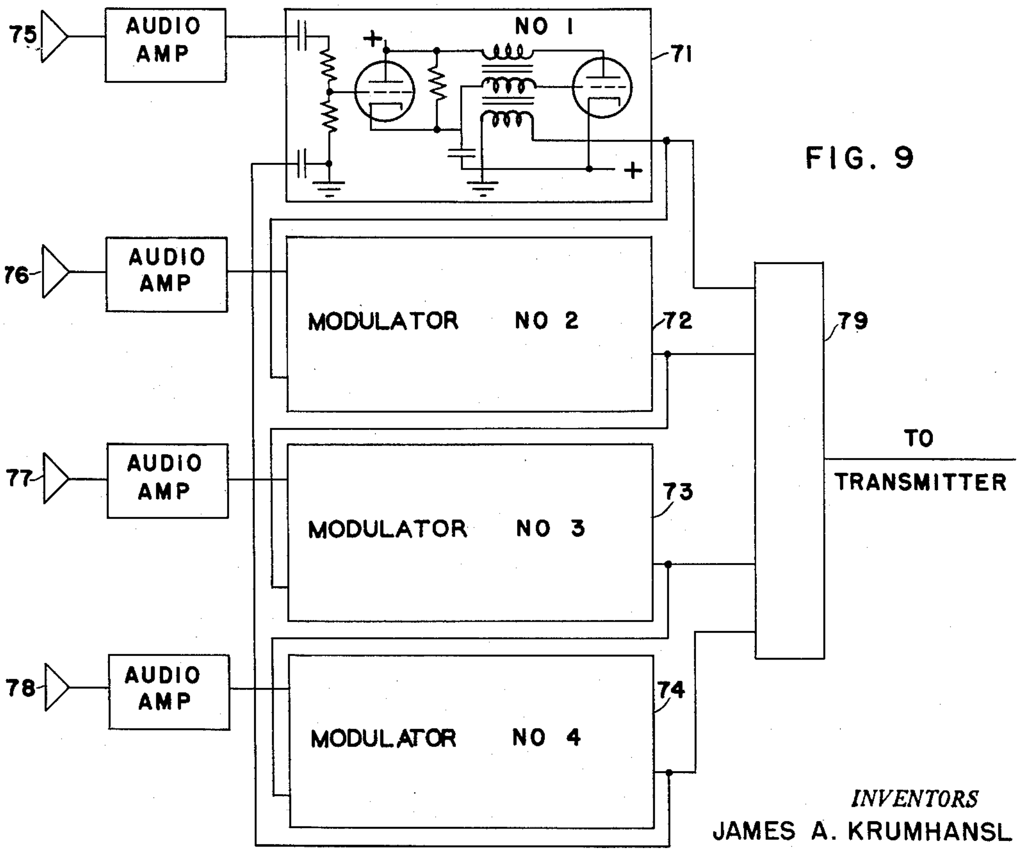
Figure 10:
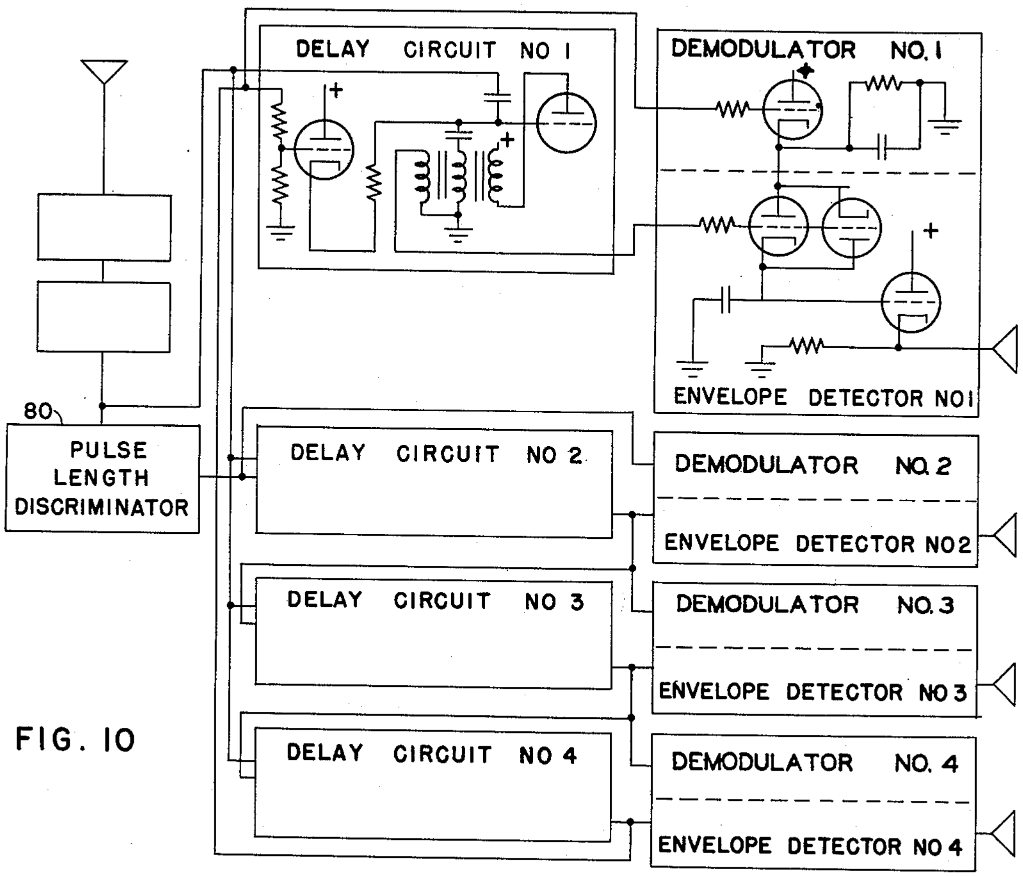
Figure 11:
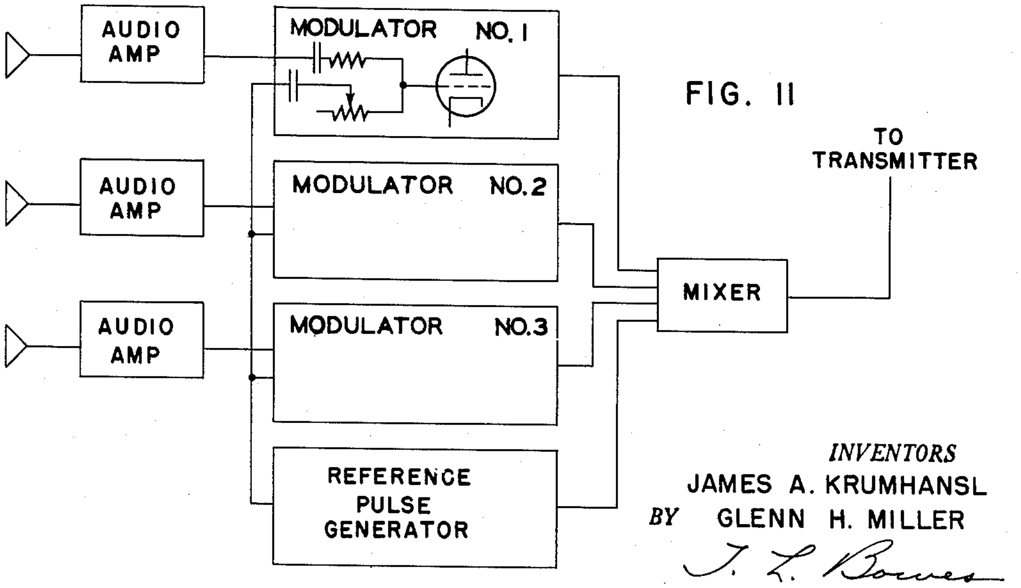
Figure 12:
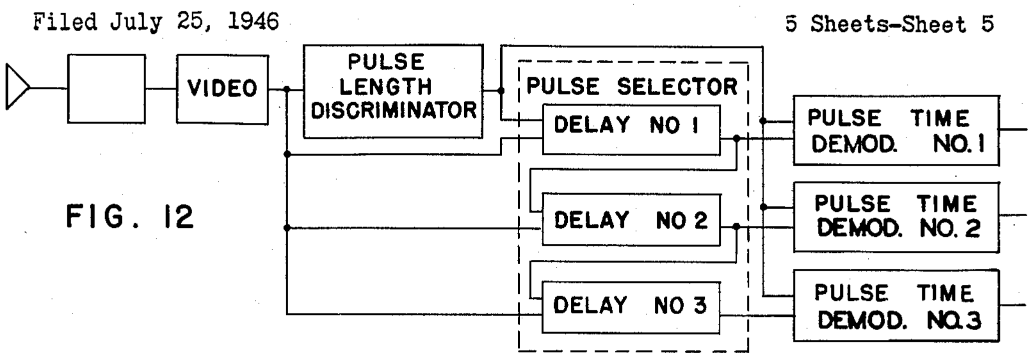
Figure 13:
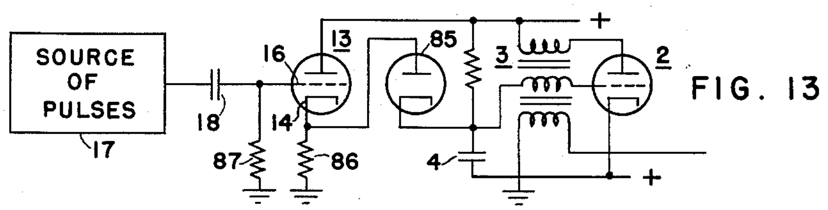
Figure 14:
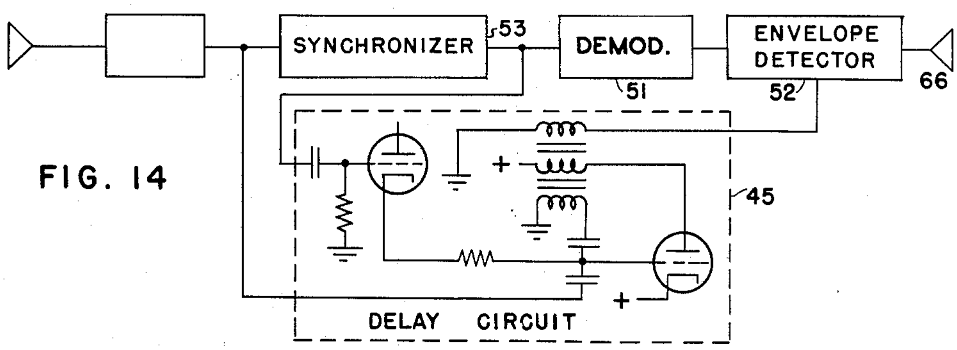
Figure 15:
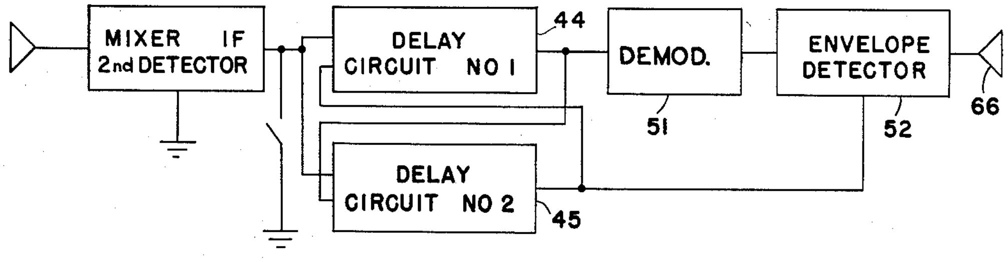

Further objects and advantages of this invention will become apparent from a reading of the following specification in connection with the drawings in which Fig. 1 is a schematic diagram of a pulse generator useful in practicing this invention, Fig. 2 is a chart useful to an understanding of the operation of the circuit of Fig. 1, Fig. 3 is a schematic diagram of a portion of a transmitting system utilizing the principles of our invention, Fig. 4 is a chart helpful in understanding the operation of the circuit of Fig. 3, Fig. 5 is a partial schematic diagram of receiving means to be used with the transmitting means of Fig. 3, Fig. 6 is a graph illustrating the operation of the circuits shown in Fig. 5, Figs. 7 and 8 represent transmitting and receiving means respectively for a single channel pulse communication system embodying the principles of this invention but in which no reference pulses are used, Figs. 9 and 10 illustrate a multi-channel pulse communication system following the principles of this invention, but in which no reference pulses are used, Figs. 11 and 12 depict transmitting and receiving means respectively for a multi-channel communication system employing reference pulses, Fig. 13 is a modification of the delay circuit of Fig. 1, and Figs 14 and 15 are modifications of the system shown in Fig. 5.

This invention utilizes time modulated pulses by which is meant that the spacing between successive pulses of a train of pulses is representative of the intelligence being transmitted. In order properly to time the occurrence of such pulses there is employed suitable coding or timing means. The operation of the pulse time modulator utilized in this invention is probably best understood from a consideration of the delay circuit illustrated in Fig. 1 of the drawing which includes a blocking oscillator 1, having an electron discharge device such as a triode 2, a suitable transformer 3, a capacitor 4 and a resistor 5. The anode 6 of the discharge device 2 is connected to a suitable source of positive potential through one winding 7 of transformer 3. The cathode 8 of discharge device 2 is connected to a suitable source of positive potential in order to establish suitable bias for the discharge device (preferably approximately half of the potential of the anode supply voltage). The cathode 8 is also connected to one side of capacitor 4. The other side of capacitor 4 is connected to control electrode 9 of discharge device 2 through another winding 10 of transformer 3. The resistance 5 is connected between a suitable source of positive potential and the common connection between capacitor 4 and transformer winding 10. The third winding 11 of transformer 3 constitutes part of the output circuit of the blocking oscillator 1.

During periods of conduction through discharge device 2, capacitor 4 becomes charged to approximately the difference between the positive potential and the cathode potential with the upper side of capacitor 4 as viewed in Fig. 1 negative with respect to the cathode 8. When conduction through device 2 ceases, the potential at control electrode 9 is approximately zero, assuming that cathode 8 is connected to a source of potential approximately half that of the anode supply. Hence, the upper side of capacitor 4 is driven negative to a potential equal to approximately half that of the anode supply. Capacitor 4 charges exponentially through resistance 5 until the potential at control electrode 9 reaches the cut-off level and the discharge device 2 is again rendered conducting. The foregoing description covers the blocking oscillator operation which produces the sawtooth wave shown in Fig. 2A.

The delay circuit of Fig. 1 also includes a control tube, such as triode 13, having a cathode 14 connected to the common connection between capacitor 4 and resistance 5, an anode 15 connected to a suitable source of positive potential and the control electrode 16 connected to a suitable source of input pulses 17 through suitable coupling means as, for example, capacitor 18. In the absence of input pulses, discharge device 13 is inoperative and the cathode 14 is positive with respect to the control electrode 16 of discharge device 13.

Input pulses, represented at Fig. 2B, render discharge device 13 conducting to impose a potential representing the potential of the input pulses on the capacitor 4 by cathode follower action. The appearance of the pulse thus modifies the charge on capacitor 4 by the amplitude of the peak pulse voltage. After the input pulse falls, capacitor 4 continues to charge exponentially. Referring to Fig. 2C, it is seen that capacitor 4 charges along the line 20 until an input pulse is received at which time the charge on capacitor 4 suddenly increases by the amount of the input pulse voltage. As explained above, after the pulse falls, capacitor 4 continues to charge at approximately the same rate as before as indicated by the line 20*a* of Fig. 2C until the charge reaches cutoff as indicated by the horizontal dashed line of Fig. 2C. At this time, the output pulse, shown at 21*a* of Fig. 2D, is produced.

If the amplitude of the input pulses is increased to the amount indicated by the dotted block surmounting one of the pulses in Fig. 2B, the charge on capacitor 4 is increased a proportionate amount by the appearance of each pulse so that after the pulse falls, the charging of capacitor 4 continues along the dashed line 20*b* instead of 20*a*. Obviously, the cut-off level is reached sooner than in the previously considered case and the corresponding output pulse is produced at the time indicated by the dotted pulse 21*c* in Fig. 2D. If the preceding pulse is indicated by the numeral 21*a*, it is seen that spacing between pulse 21*a* and pulses 21*b* and 21*c* is different. In other words, the blocking oscillator or pulse generator 1 produces an output pulse after a certain time delay following the receipt of any pulse and the amount of delay is determined by the length of time required for the potential on capacitor 4 to rise from the peak input pulse voltage to the firing potential of discharge device 2. The delay is independent of the potential existing before the pulse because the pulse potential is not added to the existing potential, but merely lifts the potential of capacitor 4 to the level of the maximum voltage of the input pulses.

Fig. 13 illustrates a modification of the delay circuit shown in Fig. 1 in which cathode 14 of discharge device 13 is grounded through resistance 86 and control electrode or grid 16 is connected to ground through resistance 87. Hence cathode 14 is at approximately grid potential. To enable capacitor 4 to be charged to a higher potential than that of cathode 14, a diode 85 is interposed between cathode 14 and the upper side of capacitor 4.

In Fig. 3, there is illustrated an adaptation of the delay circuit shown in Fig. 1 to a communication system. The same numerals used in Fig. 1 are used for corresponding parts. By impressing a potential corresponding to intelligence to be transmitted on the control device 13, in addition to pulses from a suitable reference pulse generator 28, the delay between successive pulses produced by pulse generator 1 can be made to depend upon the amplitude of the signal voltage at the instant at which the reference pulse is applied. The circuit of Fig. 3, therefore, produces pulse time modulation in which the signal voltage is sampled, i. e. utilized to operate the pulse generator or modulator, at intervals varying with the amplitude of the signal voltage.

The pulse time modulator 29 of Fig. 3 includes the delay circuit of Fig. 1. Resistances 30 and 31 are inserted between coupling capacitors 32 and 33, respectively, and control electrode 16. A suitable source of signal input, such as a microphone 34, is connected to capacitor 32 through a suitable audio amplifier 35. The reference pulses are applied through coupling capacitor 33. The function of the resistance means comprising resistances 30 and 31 is to impress desired proportions of the reference pulse and the input signal potentials on the control electrode 16. Obviously, resistances 30 and 31 may be a single resistance in which the voltage representing the intelligence is connected to one point thereof, the reference pulses are applied at another point thereof, and the control electrode 16 is connected intermediate the other connections. Moreover, the point of connection of control electrode 16 may be variable and the points of application of one or both of the input voltages may be adjustable in order to provide control of the voltage proportions.

Discharge device 13, of course, is rendered conductive whenever the potential on control electrode or grid 16 is above the cut-off level. For convenience, if $E_s$ represents the instantaneous potential of the signal voltage and $E_p$ represents the potential of the reference pulses, the proportions of $E_s$ and $E_p$ are chosen such that neither the maximum signal voltage $E_s$ nor the pulse voltage $E_p$ occurring alone causes conduction of device 13. Since $E_p$ is substantially constant, the rate of firing of discharge device 13 changes according to the frequency with which the sum of signal voltage and pulse voltage exceeds cut-off. If this sum is represented as $E_s+BE_p$, the delay in rendering conductive discharge device 2 depends upon the difference between the firing voltage and the sum of $E_s$ and $BE_p$. Since B and $E_p$ are fixed, the amount of delay depends upon the amplitude of $E_s$ and the average delay may be changed by changing $E_p$ or B.

The system of Fig. 3 includes not only the pulse time modulator 29 and the source of reference pulses 28, but also a mixing circuit 21. The form of mixer illustrated in the present application comprises a pair of normally inoperative electron discharge devices 22 and 22*a* which may be triodes having anodes 23 and 23*a*, respectively, connected to a suitable source of positive potential, cathodes 24 and 24*a*, respectively, connected together and to one end of a suitable resistance 37, the other end of resistance 37 being grounded. The output of the pulse time modulator 29 is impressed upon the control electrode 25 of discharge device 22 and the output of reference pulse generator 28 is applied not only to the pulse time modulator 29, but also to the control electrode 26*a* of discharge device 22*a*. The resistance 37 constitutes a common load means or device for both discharge devices and in the illustrated form of our invention each discharge device is connected as a cathode follower. The pulses appearing across resistance 37 are conducted to the remaining parts of the transmitting system, not shown.

In order to obtain faithful reproduction of signals, it is desired that the repetition rate of the reference pulses be relatively great. Inasmuch as modulation is a form of sampling process in which the signal voltage is sampled at intervals, more faithful reproduction will be obtained if a large number of samplings is made. However, this invention is useful even though the repetition rate of reference pulses is as low as one reference pulse for each half cycle of the input signal voltage. The amplitude of the reference pulses should be at least equal to the difference between the maximum positive signal voltages and the maximum negative signal voltages.

Fig. 4 illustrates operation of the coder 29 of Fig. 3. At Fig. 4A there are represented reference pulses. At Fig. 4B there is represented a typical input audio or signal voltage. At C of Fig. 4 there is depicted the variations in charge of capacitor 4 and hence the change of potential at control electrode 9 of discharge device 2. Finally, at Fig. 4D there are shown the output pulses from the coder which occur whenever the control electrode potential of device 2 reaches cut-off as represented by the dashed line in Fig. 4C.

A suitable system for receiving and reproducing the time modulated pulses emitted by a transmitting system utilizing the modulator shown in Fig. 3 is illustrated in Fig. 5. The signals may be received on a suitable antenna 41 and after being passed through suitable mixing and I. F. circuits represented by the numeral 42 and a suitable second detector and amplifier represented by the numeral 43, the pulses are impressed on suitable pulse selectors such as the two delay circuits 44 and 45 for separating reference and signal pulses. The details of these delay circuits form no part of the present invention but are illustrated, described and claimed in U. S. Patent No. 2,536,816 dated January 2, 1951, of James A. Krumhansl and Glenn H. Miller, filed May 29, 1946, and assigned to the same assignee as the invention described and claimed herein. Inasmuch as the operation of the two delay circuits is the same, reference will be made to only one of the delay circuits.

Delay circuit 44 comprises a blocking oscillator 46 including discharge device 47, suitable transformer 48 and capacitor 49. As explained in the above identified copending application, the blocking oscillator 46 produces an output pulse on the appearance of the next signal pulse following the receipt of a reference pulse at the control electrode of a unilateral device, such as the triode 50. Both signal and reference pulses transmitted and received on antenna 41 are impressed upon capacitors 49 in delay circuits 44 and 45. The blocking oscillators are not rendered operative, however, because the amplitude of the received pulses alone is insufficient to overcome the positive bias of discharge devices 47. Moreover, the received pulses are coupled to the control electrode of discharge devices 47 from a low impedance source, such as the output transformer winding 51 in the amplifier represented by the numeral 43, so that any charge on capacitors 49 follows closely the incoming pulses. At other predetermined times, however, reference pulses are impressed upon capacitors 49 and the control electrodes of discharge devices 47 through the unilateral devices 50 which serve to charge the capacitors 49 to a predetermined level. The charge applied to capacitors 49 through the unilateral devices 50 remains on capacitors 49 because no discharge path is provided. Hence, if the predetermined level is correctly chosen, the next signal pulse fires the discharge device 47 to produce an output pulse.

In considering the operation of the delay circuits in the receiving means of Fig. 5, let it be assumed that the various power supplies are connected. Minute differences in the wiring and tube characteristics, for example, will cause one of the discharge devices 47 to become conductive. Output pulses of the first delay circuit 44 are impressed only on pulse time demodulator 51, whereas the output pulses from the second delay circuit 45 are impressed upon envelope detector 52 and also delay circuit 44. Hence output pulses of delay circuit 45 constitute reference pulses for the first delay circuit 44.

It will also be observed that the input pulses are applied not only to capacitors 49 in each delay circuit but also to synchronizing means 53. Pulses appearing in the output of the synchronizing circuit 53 are applied as reference pulses to the second delay circuit 45. Thus, transmitted reference pulses determine the times of operation of the second delay circuit 45.

The synchronizing circuit 53 is provided in order to synchronize the operation of the delay circuits so that signal pulses and not reference pulses will be passed through the receiving system for reproduction. Synchronizing may be accomplished simply by causing reference pulses to have a different characteristic from the intelligence carrying pulses. For example, pulses of a predetermined length may be produced in the reference pulse generator 28 of Fig. 3 and a pulse length discriminator may be utilized as the synchronizing means 53, so that only pulses of the predetermined characteristic, i. e., length or time duration in the assumed example, will energize the second delay circuit 45. Suitable pulse length discriminators are shown, described, and claimed in Patent No. 2,484,352 dated October 11, 1949, of James A Krumhansl and Glenn H. Miller, filed March 26, 1946, assigned to the same assignee as the invention described and claimed in the present application.

The pulse time demodulator 51 may comprise a discharge device, such as a triode 54 having an anode 55 connected to a suitable source of positive potential, a cathode 56 connected to ground through an R-C network including resistance 57 and electric storage means, such as capacitor 58, connected in shunt and having values of resistance and capacitance to provide a time constant approximately equal to that of the modulator. The output pulses from delay circuit 44 are impressed upon the control electrode 59 of discharge device 54 and render conductive the discharge device 54 to charge capacitor 58. Between successive pulses the charge leaks off capacitor 58. This operation is illustrated in Fig. 6 in which the curve 60*a* represents the variation in charge of capacitor 58. Thus, a maximum charge is reached and then discharge takes place exponentially until the next operation of discharge device 54 again lifts the charge to its maximum value.

In order to separate the envelope from the sawtooth wave, there is provided an envelope detector 52 including a pair of discharge devices, such as triodes 62 and 63, the anodes and cathodes being inversely connected and the control electrodes being connected together. The voltage appearing across the R-C network 57, 58 is applied to one anode-cathode connection and the output of the second delay circuit 45 is connected to the control electrodes of devices 62 and 63. A second electrical storage device such as capacitor 64 is connected between the other anode-cathode connection of devices 62 and 63 and ground, so that whenever either device 62 or 63 conducts, the charge appearing across capacitor 58 is transferred to capacitor 64. The voltages appearing across capacitor 64 are passed through a suitable audio amplifier 65 and reproduced by suitable reproducing means such as a loud speaker 66. In order to prevent the discharge of capacitor 64 between pulses, the capacitor 64 is connected to the audio amplifier 65 through a suitable high impedance device, such as an electron discharge device 67 connected as a cathode follower. The details of the pulse time demodulator and envelope detector which cooperate to reproduce the original intelligence as herewith described are shown, described, and claimed in Patent No. 2,467,486, dated April 19, 1949, of James A. Krumhansl and Harold Goldberg, filed February 9, 1946, and assigned to the same assignee as the invention described and claimed herein.

Thus, output pulses from delay circuit 45 are used to transfer the charge from capacitor 58 to capacitor 64 by rendering conductive either discharge device 62 or 63, depending upon the relative potentials across capacitors 58 and 64 at that time. At the same time, the output pulses from delay circuit 45 are impressed upon the first delay circuit 44 to render conductive discharge device 50 associated therewith to prepare the blocking oscillator 46 for operation upon receipt of the next reference pulse. Upon receipt of the next reference pulse, discharge device 47 in delay circuit 44 is rendered operative and a pulse corresponding in time is applied to the pulse time demodulator to recharge capacitor 58. The receipt of the reference pulse in delay circuit 45 prepares delay circuit 45 for operation. Then, completing the cycle, receipt of the next signal pulse triggers delay circuit 45 to again transfer the charge from capacitor 58 to capacitor 64 and prepares delay circuit 44 for operation. This sequence is illustrated in Fig. 6 wherein, at A, there are represented reference pulses 60 and signal pulses 61. Referring to Fig. 6B, receipt of reference pulses causes charge and discharge of capacitor 58 as indicated by curve 60*a*. At the times of receipt of signal pulses 61, the potential on capacitor 58 which is transferred to capacitor 64 is indicated by points 60*b*, *c*, *d*, and *e*. The potential at capacitor 64 follows the dashed line 61*a*, i. e., follows the samplings made of the recurring voltage 60*a* by the envelope detector. The original signal, approximated by the curve 61*a*, is represented by curve 61*b*. By using a sufficiently great repetition rate, the approximation is quite close.

In Fig. 14, there is illustrated a modification of the receiving system illustrated in Fig. 5, in which only one delay circuit is employed and the synchronizing circuit 53 is substitued for delay circuit 44. In this arrangement, reference pulses pass through the synchronizer 53 and not only prepare delay circuit 45 for operation but also charge the capacitor in demodulator 51 as previously described. Upon receipt of the next pulse, which is a signal pulse, the delay circuit 45 is triggered. The output pulse from delay circuit 45 operates envelope detector 52 to sample the charge on the capacitor in demodulator 51.

Reference to Fig. 6 suggests that instead of utilizing the reference pulses to operate the demodulator, and signal pulses to sample the condition of the demodulator, it should be possible to reverse functions of the delay circuits of Fig. 5. With reference pulses of constant repetition rate, it should be immaterial whether the difference in time of occurrence of signal pulses is related to the preceding or the following reference pulses, so long as the straight line portion of curve 60*a* of Fig. 6B is followed. Thus, the circuit of Fig. 5 may be modified to accomplish this result by reversing the input leads to delay circuits 44 and 45. With such an arrangement, referring to Fig. 6A, the time periods $t_2$ instead of time periods $t_1$ are employed. In Fig. 6C, there is illustrated the operation of the modified circuit. The same output curve is obtained but the instantaneous polarity is reversed as compared to the audio curve 61*b* of Fig. 6B.

In Fig. 15, another variation of the circuit of Fig. 5 is illustrated. In this arrangement, only one demodulator and one envelope detector are used and the synchronizing circuit is eliminated. With this arrangement, there need be no distinguishing characteristic between reference pulses and signal pulses. By reason of circuit and tube differences, one of the delay circuits will operate first and thereafter this circuit operates on every other pulse and the other delay circuit operates on the intermediate received pulses. The output of one delay circuit controls operation of the demodulator and the output of the other delay circuit controls operation of the envelope detector. The output of each delay circuit also serves as reference or "preparing" pulses for the other delay circuit. Selection of the signal to be reproduced may be made in any desired fashion. A simple arrangement is merely to short circuit momentarily the amplifier following the second detector and repeat the operation until the envelope detector and demodulator are energized, respectively, by the proper series of pulses. This operation may be performed by switch means across the output of the amplifier.

Figs. 7 and 8 disclose, respectively, transmitting and receiving means utilizing the pulse time modulator 29 of Fig. 3 and pulse time demodulator 51 and envelope detector 52 of Fig. 5. However, the circuits are simplified by the elimination of reference pulses. In order to obtain a voltage to serve the same purpose as the reference pulses of the circuit of Fig. 3, the output pulses of the modulator 29 are caused to be impressed on a suitable delay circuit 70 and the output pulses from the delay circuit 70 are utilized as reference pulses. The delay circuit may comprise an artificial transmission line or a delay multivibrator, for example. A similar delay circuit must be used in the receiving system as shown in Fig. 8 in order to withhold conduction through the demodulator until after the transfer of charge from capacitor 58 of the demodulator 51 to capacitor 64 of envelope detector 52.

Figs. 9 and 10 illustrate a different embodiment in which the principles of this invention are utilized to provide a multi-channel system without reference pulses. There is provided a modulator for each input source of signal voltage. Instead of reference pulses, the output of each modulator is utilized as the reference pulse for the next modulator in succession. Referring to Fig. 9, there is illustrated a four channel system embodying modulators 71, 72, 73 and 74. Each modulator has a separate signal input circuit as for example, microphones 75, 76, 77 and 78 and suitable amplifiers. Inasmuch as the output of each modulator serves as a reference pulse for the next modulator, the various modulators will be rendered operative in succession and hence, successive spaced pulses will be transmitted after passage through the mixer 79 which is the same in principle as mixer 21 of Fig. 3 except that four electron discharge devices are employed instead of the two shown in Fig. 3. As a result, there will be transmitted groups of time modulated pulses on a single band of frequencies and successive pulses in each group will represent a different signal source.

In Fig. 10, there is illustrated a receiving system adapted to select and demodulate the signals emitted by the transmitting means of Fig. 9. The multi-channel selector system comprises a delay circuit, a demodulator and an envelope detector for each channel. The components of each channel are the same as those described in connection with Fig. 5. Inasmuch as selection of a desired one of the four signals transmitted is desired, synchronizing means may be provided. For example, one modulator may be arranged to produce pulses of a predetermined length and a pulse length discriminator 80 may be included in the input circuit to the corresponding selector circuit. Thus, if modulator No. 2 of Fig. 9 is thus arranged, the pulse length discriminator 80 of Fig. 10 would be associated with delay circuit No. 2 of Fig. 10.

In order to illustrate operation of the circuit of Fig. 10, let it be assumed that there is received a signal pulse corresponding to channel No. 2. The pulse length discriminator 80 passes this pulse to prepare the channel No. 2 delay circuit for operation and also operates demodulator No. 2 to charge the capacitor associated therewith. The receipt of the signal pulse corresponding to channel No. 3 triggers channel delay circuit No. 2. The output of delay circuit No. 2 conditions the delay circuit of channel No. 3 for operation and also operates the envelope detector associated with channel 2 to transfer the charge now remaining from the pulse corresponding to channel No. 2. Furthermore, the output signals from delay circuit No. 2 cause operation of the demodulator associated with channel No. 3. Thus, receipt of a signal pulse representing channel No. 3 triggers delay circuit No. 2, charges demodulator No. 3 and prepares delay circuit No. 3 for operation upon receipt of the pulse corresponding to channel No. 4. Similarly, receipt of the pulse corresponding to channel No. 4 triggers delay circuit No. 3, charges the demodulator associated with channel No. 4 and prepares delay circuit No. 4 for operation. These steps proceed until delay circuit No. 1 is operated. At this point, it is noted that the output of delay circuit No. 1 is connected only to the envelope detector associated with channel No. 1, because incoming pulses of a predetermined length serve as reference pulses for delay circuit No. 2 and to charge the demodulator for channel No. 2.

In Figs. 11 and 12, there are shown transmitting and receiving systems respectively for a four-channel system in which three channels carry signals representing intelligence to be transmitted and the fourth channel carries reference pulses of a predetermined pulse length. In this embodiment of the invention each modulator of Fig. 11 is adjusted by varying the amount of reference pulse voltage applied to the associated discharge device 13 as indicated by the different settings of the resistances 30 and 31 (see Fig. 3). The various adjustable resistances will be set so that the average delay will not result in overlapping of pulses in the mixer.

In view of the previous description, it is believed unnecessary to describe Fig. 12 other than to point out that three delay circuits and three demodulator and envelope detector circuits are required and that the output of the pulse length discriminator which passes only the reference pulses, charges all of the demodulators and serves as the reference pulse for the delay circuit corresponding to channel No. 1. The output of the delay circuit is utilized to prepare the next delay circuit for action and to transfer the charge from the demodulator to the envelope detector, as described previously.

Modifications of our invention will occur to those skilled in the art. For example, the receiving system of Fig. 10 may be modified to provide only one reproducing means, and counting means may be used to select one output from the plurality of demodulators, thereby to enable the user to select any one signal for reproduction. Again, referring to Fig. 15, a dividing circuit of known type, arranged to divide by a factor of two, may be substituted for the synchronizer of Fig. 14.

What we claim is:

1. In a pulse communication system for transmitting and receiving time modulated pulses representing intelligence to be communicated, said transmitting means emitting reference pulses and intelligence-conveying pulses, said receiving means including a pair of electron discharge devices, each of said devices having an anode, a cathode, and a control electrode, said anodes and said cathodes being inversely connected, electric storage means associated with each anode-cathode connection, means for producing a voltage the amplitude of which is dependent upon the intervals between the receipt of said reference and desired signal pulses, means for charging one storage means according to said voltage, means for impressing said reference pulses on said control electrodes, and means for transferring the potential of the first storage means to the second storage means whenever either of said devices is rendered conductive by the receipt of a reference pulse.

2. In a pulse communication system for transmitting and receiving time modulated pulses representing intelligence to be communicated, said transmitting means emitting reference and signal pulses, said receiving means including a pair of electron discharge devices, each of said devices having an anode, a cathode, and a control electrode, said cathodes and said anodes being inversely connected, electric storage means associated with each anode-cathode connection, first and second delay means, means for introducing desired signal pulses into said first delay means, the output of said first delay means being utilized to charge one of said storage means, means for introducing both reference and desired signal pulses into said second delay means, the output of the second delay means being impressed on said control electrodes to render one of said discharge devices conductive to transfer the charge on the first storage means to the other of said storage means and to render operative the first delay means whereby the output of the first delay means causes said first storage means to be recharged, and means responsive only to said reference pulses to cause operation of said second delay means.

3. In a pulse communication system for transmitting and receiving time modulated pulses representing intelligence to be communicated, said transmitting means emitting reference and signal pulses, said receiving means including a pair of electron discharge devices, each of said devices having an anode, a cathode, and a control electrode, said cathodes and said anodes being inversely connected, an electric storage means associated with each of said anode-cathode connections, first and second normally inoperative delay means, means for utilizing reference pulses in one of said delay means for preparing said one delay means for operation, said one delay means being rendered operative upon receipt of the following desired signal pulse, means utilizing the output of said second delay means for transferring the charge from one of said storage means to the other of said storage means and preparing the other of said delay means for operation, and means utilizing the next reference pulse for rendering operative said other delay means to recharge said one storage means.

References Cited in the file of this patent

UNITED STATES PATENTS

| | | |
|---|---|---|
| 1,848,839 | Ranger | Mar. 8, 1932 |
| 2,231,375 | Watson | Feb. 11, 1941 |
| 2,391,776 | Fredendall | Dec. 25, 1945 |
| 2,395,467 | Deloraine | Feb. 26, 1946 |
| 2,408,077 | Labin | Sept. 24, 1946 |
| 2,416,330 | Labin et al. | Feb. 25, 1947 |
| 2,419,292 | Shepard | Apr. 22, 1947 |
| 2,497,411 | Krumhansl | Feb. 14, 1950 |